United States Patent
Fujisawa et al.

[11] Patent Number: 5,856,635
[45] Date of Patent: Jan. 5, 1999

[54] GROMMET

[75] Inventors: Atushi Fujisawa; Hiroo Fujita, both of Yokkaichi; Katsuhide Shiji; Keisuke Tokoro, both of Nagoya, all of Japan

[73] Assignees: Inoac Corporation, Nagoya; Sumitomo Wiring Systems, Ltd., Yokkaichi, both of Japan

[21] Appl. No.: 962,119

[22] Filed: Oct. 31, 1997

Related U.S. Application Data

[63] Continuation of Ser. No. 610,871, Mar. 5, 1996, abandoned.

[30] Foreign Application Priority Data

Mar. 9, 1995 [JP] Japan ................................ 7-079436

[51] Int. Cl.$^6$ .............................. H01B 17/26; H02G 3/22
[52] U.S. Cl. ........................... 174/153 G; 248/56; 16/2.1
[58] Field of Search .................. 174/65 G, 151, 174/152 G, 152 R, 153 G, 167; 16/2.1, 2.2; 248/56

[56] References Cited

U.S. PATENT DOCUMENTS

| | | | |
|---|---|---|---|
| 4,959,509 | 9/1990 | Takeuchi et al. | 174/153 G |
| 5,138,117 | 8/1992 | Oikawa et al. | 174/152 G |

FOREIGN PATENT DOCUMENTS

| | | | |
|---|---|---|---|
| 0580130 | 1/1994 | European Pat. Off. | 174/153 G |
| 1307295 | 9/1962 | France | 174/153 G |
| 1342949 | 10/1963 | France | 174/153 G |
| U-64-10920 | 1/1989 | Japan . | |
| 4-249817 | 9/1992 | Japan | 174/167 |
| 6-233435 | 8/1994 | Japan . | |
| 6-309977 | 11/1994 | Japan . | |
| A-7-14452 | 1/1995 | Japan . | |

*Primary Examiner*—Hyung-Sub Sough
*Attorney, Agent, or Firm*—Oliff & Berridge, PLC

[57] ABSTRACT

A grommet is mounted into an opening formed in a mating member after a wire harness containing a plurality of wires tied up in a bundle is inserted through the grommet. The grommet has a base portion formed of rubber or resin and has in the annular outer peripheral wall thereof a mounting groove fittable with an opening edge of the mating member, a roof portion extending inwardly from the opening end of the base portion, a medium diameter portion formed in a cylindrical shape having an inside diameter larger than the diameter of the wire harness to be inserted therethrough and extending upwardly in the axial direction of the grommet from the roof portion, and a small diameter portion reducing continuously in diameter from the opening end of the medium diameter portion and extending further upwardly in the axial direction of the grommet in a cylindrical manner. In the grommet, there is further formed an annular cavity in the portion of the inner peripheral wall of the base portion that corresponds to the position of the mounting groove.

2 Claims, 9 Drawing Sheets

GROMMET

This is a continuation of application Ser. No. 08/610,871 filed Mar. 5, 1996 now abandoned.

BACKGROUND OF THE INVENTION

1. Field of the Invention

The present invention relates to a grommet which is used to protect a wire harness in an extending-through portion formed in a vehicle body or the like.

2. Description of the Related Art

In a vehicle body such as a dash panel, a cowl panel and the like, there is formed an opening through which a wire harness consisting of a plurality of wires tied up together in a bundle can be inserted.

Figure 14:
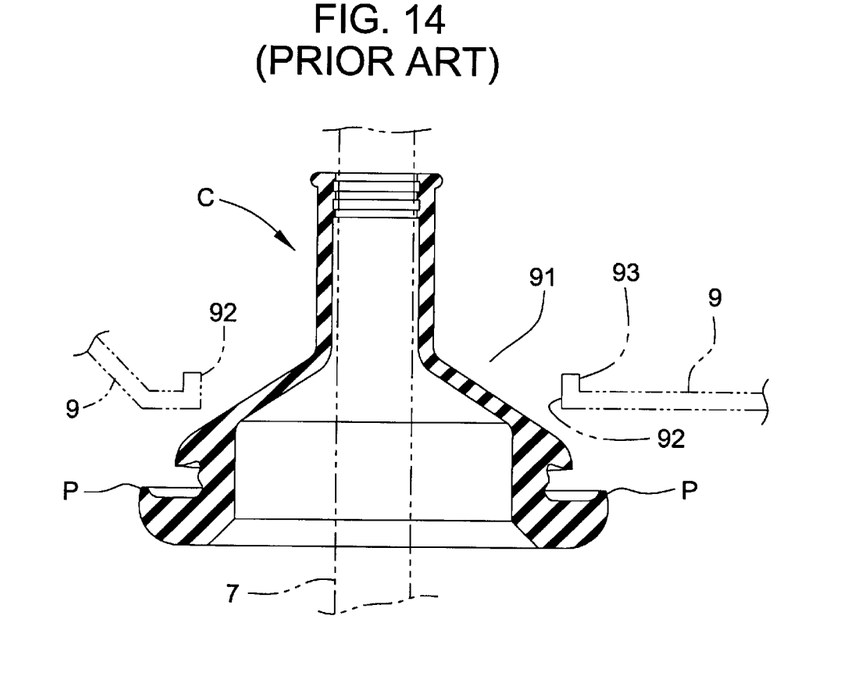
FIG. 14 is a longitudinal section view showing a conventional grommet.

Conventionally, as shown in FIG. 14, when a wire harness 7 is inserted through an opening 91, after a grommet C formed of a rubber ring is inserted into the wire harness 7, the wire harness 7 and grommet C are pulled together from a vehicle room side toward an engine room side so that the grommet C can be mounted into the opening 91. This is to protect the wire harness 7 by the grommet C and also to prevent water from leaking into the vehicle room.

Figure 15:
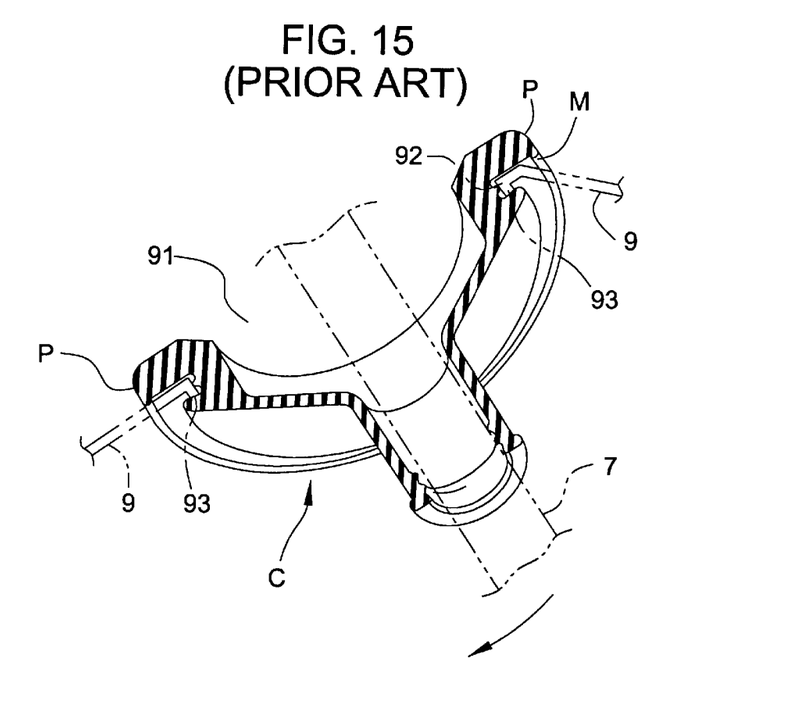
FIG. 15 is a longitudinal section view of a conventional grommet in the fitted condition thereof with respect to an opening edge of a mating member.

FIG. 15 shows a state in which the grommet C is mounted on and fitted with an opening edge 92 of a mating member 9, and in a burring 93 in which the grommet C takes a stand-up position perpendicular to the mating member 9, the grommet C is well fitted with the opening edge 92.

Figure 12:
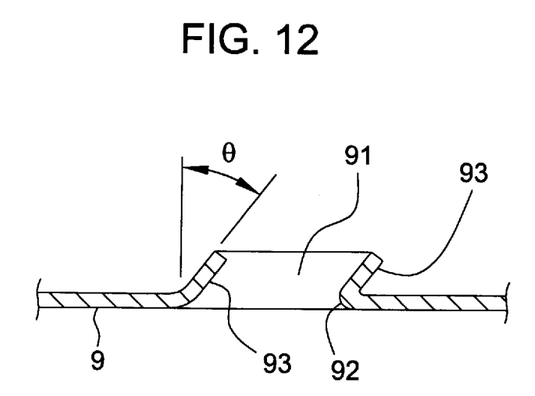
FIG. 12 is a longitudinal section view showing the mating member.

However, in recent years, the number of parts to be provided in the engine room and vehicle room have increased and thus the cowl panel and the like have been inclined in order to avoid such increased parts, whereas the direction of forming the opening 91 (that is, the opening molding direction) has been left unchanged, so that the stand-up position or attitude of the burring 93 has failed to be perpendicular to the panels. As a result, the burring 93 has been inclined and projected toward the engine room side. As shown in FIG. 12, the angle of inclination θ of the burring 93 varies in the range of 0–20 degrees although the inclination angle θ depends upon the kinds of vehicles. Under these conditions, if the grommet C is mounted, then there is produced a gap S in a mounting groove 11 fitted with the opening edge of the mating member as shown in FIG. 16, which inconveniently leads to the leakage of water into the vehicle room.

Figure 16:
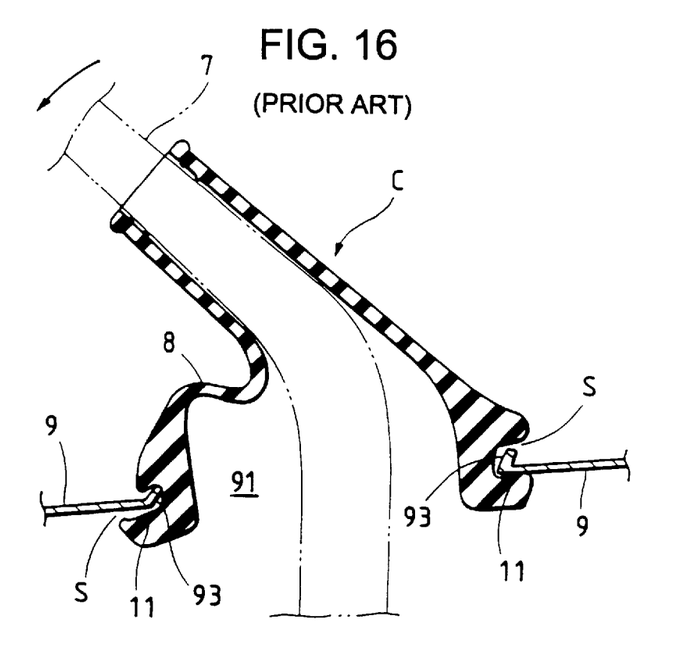
FIG. 16 is a longitudinal section view showing the conventional grommet in the fitted condition thereof with respect to the opening edge of the mating member.

Further, the wire harness 7 is normally disposed in such a manner that it is extremely bent from around the exit of the grommet C, as indicated by arrows in FIGS. 15 and 16, and this bending further expands the gap S, with the result that water more easily leaks into the vehicle room. In addition, the plane area of the grommet C existing around the opening 91 and corresponding to the mating member 9 has a tendency to decrease, and even if there is provided in the outer edge of the mounting groove 11 an annular projection P for sealing, a gap M easily appears between the mating member 9 and the annular projection P, with the result that the annular projection P is often found not useful, as shown in FIG. 15.

Moreover, in recent years, in order to prevent water from leaking through gaps between the wires which cooperate together in forming the wire harness, a filler has been loaded into the grommet. However, if the filler of this kind is loaded into the grommet, the portion of the grommet that holds the filler is then stiffened too much to be bent. Therefore, if the wire harness is so disposed as to be bent, the above-mentioned gaps S and M are expanded further.

SUMMARY OF THE INVENTION

The present invention aims at eliminating the drawbacks found in the above-mentioned conventional grommets, and therefore an object of the invention is to provide a grommet which can be fitted positively with the opening edge of a mating member thereby being capable of performing a water preventive function, even if the burring around the opening of the mating member is inclined, or even if the wire harness is bent.

In attaining the above object, according to the invention, there is provided a grommet which is mounted into an opening formed in a mating member after a wire harness comprised of a plurality of wires tied up together in a bundle is inserted through the grommet, the grommet comprising:

a base portion made of rubber or resin and including in the annular outer peripheral wall thereof a mounting groove to be fitted with the edge of the opening of mating member;

a roof portion extending inwardly from the opening end of the base portion;

a medium diameter portion formed in a cylindrical shape having an inside diameter larger than the diameter of the wire harness to be inserted through the grommet and extending from the roof portion upwardly in the axial direction thereof; and a small diameter portion reducing in diameter continuously from the opening end of the medium diameter portion and extending in a cylindrical manner further upwardly in the axial direction thereof;

wherein an annular cavity is formed in the portion of the inner peripheral wall of the base portion that corresponds to the position of the above-mentioned mounting groove.

Here, referring in particular to the term "upwardly in the axial direction", "the axial direction" means a direction in which the wire harness is inserted. On the other hand, the grommet is formed in a substantially conical shape which is tapered from the base portion toward the small diameter portion. The term "upwardly" means the direction in which the grommet is tapered.

In the grommet of the invention, the mounting groove of the base portion thereof is dented in such a manner that it has a U-shaped longitudinal section, and a plurality of ring shaped seal ring portions are raised formed at positions existing in the lower surface of the mounting groove and situated inwardly from the outside diameter of the base portion.

Also, in the grommet of the invention, an inwardly facing flange projecting in the central direction of the grommet is provided in a portion where the roof portion is connected to the medium diameter portion.

Further, in the grommet of the invention, the cylindrical diameter of the medium diameter portion increases in an inverted taper manner as it goes upwardly in the axial direction from the roof portion to the small diameter portion.

Further, in the grommet of the invention, a through pipe for a hood cable having a sealed leading end is formed integrally with the roof portion of the grommet in such a manner that it extends downwardly in the axial direction from the roof portion, and the leading end of the through pipe is projected beyond the bottom surface of the base portion.

According to the invention, since the annular cavity is formed in the portion of the inner peripheral wall of the base portion that corresponds to the position of the mounting groove, the mounting groove is readily deformed elastically, and even if the burring of the opening edge of the mating member is inclined, the mounting groove is able to follow such inclination of the burring and come into close contact with the inclined burring.

Also, since the medium diameter portion having an inside diameter larger than the diameter of the wire harness is formed between the roof portion and small diameter portion and a filler is loaded into the medium diameter portion, the portion of the grommet corresponding to the medium diameter portion is stiffened and is thereby difficult to bend. However, the roof portion and small diameter portion can be bent because no filler is loaded in these portions. Therefore, even if the wire harness is bent, the bending of the wire harness can be absorbed by the roof and small diameter portions, so that the bending of the wire harness has no influence on the base portion including the mounting groove.

Also, according to the invention, since the ring-shaped seal ring portions are raised at positions existing in the lower surface of the mounting groove and situated inwardly of the outer shape of the base portion, even if a sufficient plane area cannot be secured around the edge of the opening, but, if a plane area can be secured in the range of the seal ring portions, then the grommet is allowed to have a water preventive function.

Further, according to the invention, since there is provided an inwardly facing flange, the inwardly facing flange provides a stopper against the filler loaded in the medium diameter portion and, for this reason, even if the wire harness is disposed while it is bent, the filler is prevented from slipping off.

Further, according to the invention, since the cylindrical diameter of the medium diameter portion increases in an inverted taper manner as it goes upwardly in the axial direction from the roof portion to the small diameter portion, when the wire harness is bent, even if a filler is not loaded in the medium diameter portion, the root portion or narrow portion of the medium diameter portion can be bent to thereby lower the bending gravity of the wire harness. When a filler is loaded in the medium diameter portion, the filler is difficult to slip off because the medium diameter portion has an invertedly tapered shape.

Moreover, according to the invention, since the leading end of the through pipe is projected beyond the bottom surface of the base portion, in the case of a vehicle to which a hood cable is applied, the leading end of the through pipe may be cut off to thereby allow the grommet to be seated on a base member correctly. On the other hand, in the case of a vehicle to which no hood cable is applied, the grommet may be inclined on the base member, so that the assembling condition of the grommet can be checked visually without looking at the bottom surface of the base portion.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Now, a description will be given below in detail of several embodiments of the invention with reference to the accompanying drawings.

In FIGS. 1–11, there is shown a grommet according to an embodiment of the invention.

The grommet is made of rubber or resin. In this embodiment, as the material of the grommet, there is employed ethylene-propylene rubber (EPDM) and the grommet is a rubber molding having a substantially conical shape which is generally tapered upwardly. When a wire harness 7 is inserted through an opening 91 formed in a body panel of a vehicle, this grommet is mounted in the opening 91 and is used as a protection part for the exterior of the harness 7 as shown in FIG. 16.

Figure 10:
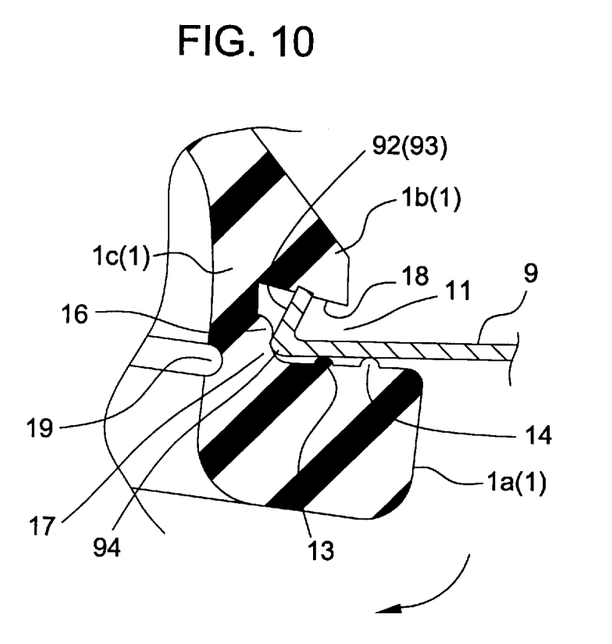
FIG. 10 is an enlarged section view showing the base portion of the grommet in the fitted condition thereof with respect to the mating member of the grommet.

In the drawings, reference numeral 1 designates a base portion which is situated in the bottom portion of the grommet, and the base portion 1 is comprised of a thick annular body (in the present embodiment, the outside diameter thereof: approximately 70 mm, the inside diameter thereof: approximately 50 mm, and the height thereof: approximately 20 mm) which includes a ring-shaped mounting groove 11 in the outer peripheral wall thereof. When the mounting groove 11 of the base portion 1 is fitted with an opening edge 92 of a mating member (such as a cowl panel or the like), then the grommet can be fixed to the mating member as shown in FIG. 10.

The mounting groove 11 is a recessed groove having a substantially U-shaped longitudinal section, while the mounting groove 11 is defined by a lower jaw portion 1a and a connecting portion 1c which are both elements of the base portion 1. In order to fixed 14 insert the grommet into the mating member 9 perfectly, the lower jaw portion 1a and connecting portion 1c are made thick. For example, the lower jaw portion 1a has a thickness of the order of 8 mm.

Figure 9:
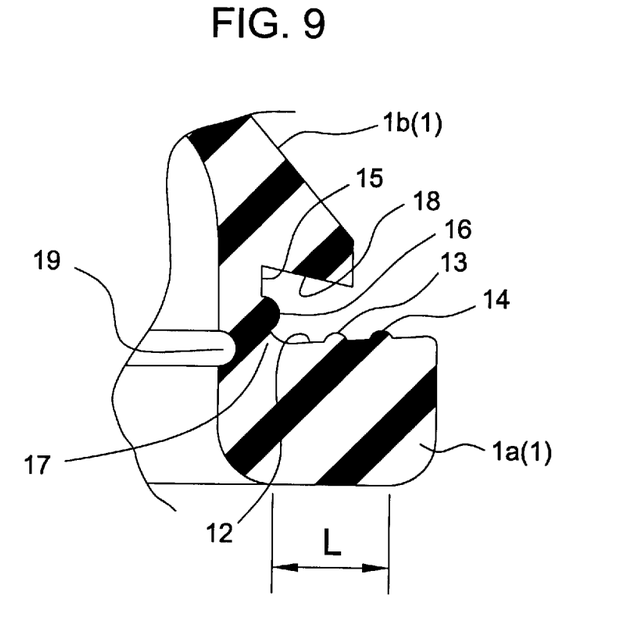
FIG. 9 is an enlarged section view showing a base portion of the grommet and its neighboring portions.

On the lower surface 12 of the mounting groove 11, there are provided seal ring portions 13 and 14 which are formed by raising them from the lower surface 12 in a ring manner into concentrically circular projecting portions. The seal ring portions 13 and 14 are respectively formed at positions situated inwardly of the outside diameter of the base portion 1. If the plane securing length L of the base portion 1 with respect to the mating member 9 is approximately 6 mm in the outward direction from the opening 91 as shown in FIG. 9, then the stable seal can be secured by these seal ring portions 13 and 14. Also, in the vertical surface 15 of the mounting groove 11, there is provided an annular projection 16.

When the grommet is fitted with the mating member 9 and the inner end portion 94 of the opening edge 92 is abutted against the corner portion 17 of the grommet in which the lower surface 12 and vertical surface 15 of the mounting groove 11 intersect each other, the seal ring portions 13, 14 and annular projection 16 are lapped over the corresponding portions of the mating member 9, that is, overlapping portions are formed between the grommet and mating member 9. Due to the existence of the overlapping portions, the elastic deformation of the rubber allows the grommet and mating member 9 to be brought into pressure contact with each other, thereby being capable of providing a further higher water preventive function. That is, since the rubber is flexible, the overlapping portions can be deformed elastically to a certain degree, which allows the grommet to come into close contact with the mating member 9.

Further, the upper surface 18 of the mounting groove 11 is inclined downwardly to approach the lower surface 12 as it goes outwardly from its connecting portion with the vertical surface 15 as shown in FIG. 9. This structure is employed in order that, at whatever angles the burrings are inclined, the leading ends of the burrings 93 can be abutted against the upper surface 18 of the mounting groove 11 for sealing. This structure is employed in order that the outer end of the upper surface 18 can bite the opening edge 92 and its neighboring portions of the mating member 9 with which the upper surface 18 is fitted, thereby being capable of fixing the grommet to the mating member 9 positively.

For reference, the lower surface 12 is also inclined upwardly but gradually to approach the upper surface as it goes outwardly from its connecting portion with the vertical surface 15, so that the lower surface 12 is able to bite the mating member 9 as shown in FIG. 9.

On the other hand, in the portion of the inner peripheral wall of the base portion 1 that corresponds to the position of the mounting groove 11, there is formed an annular cavity 19 (in this embodiment, a semicircular cavity having a diameter of the order of 2 mmφ).

Figure 4:
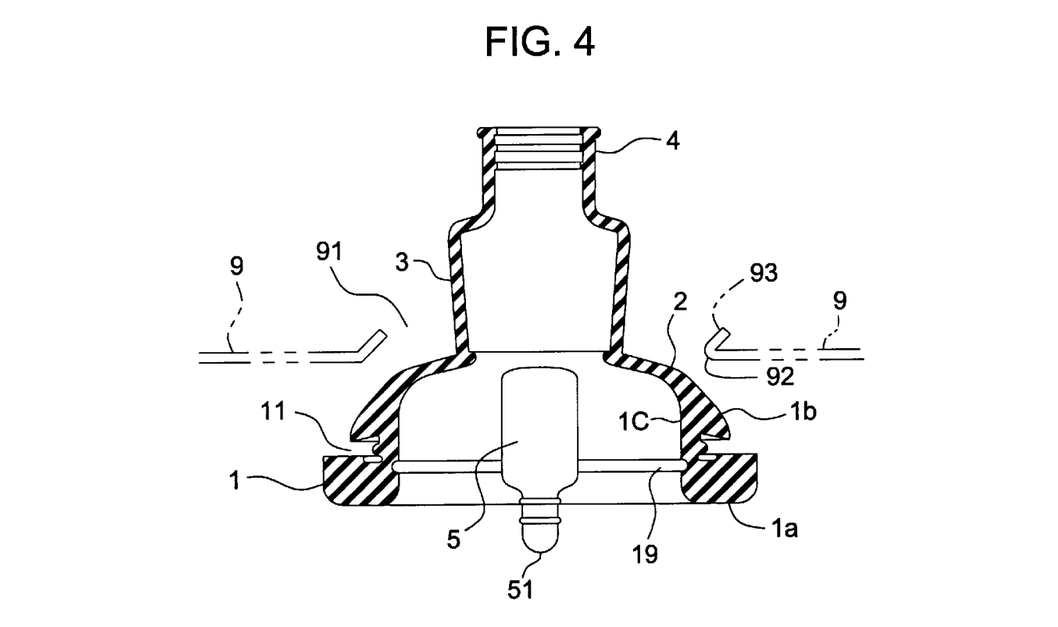
FIG. 4 is an enlarged section view showing the grommet taken along the line C—C shown in FIG. 2.
Figure 5:
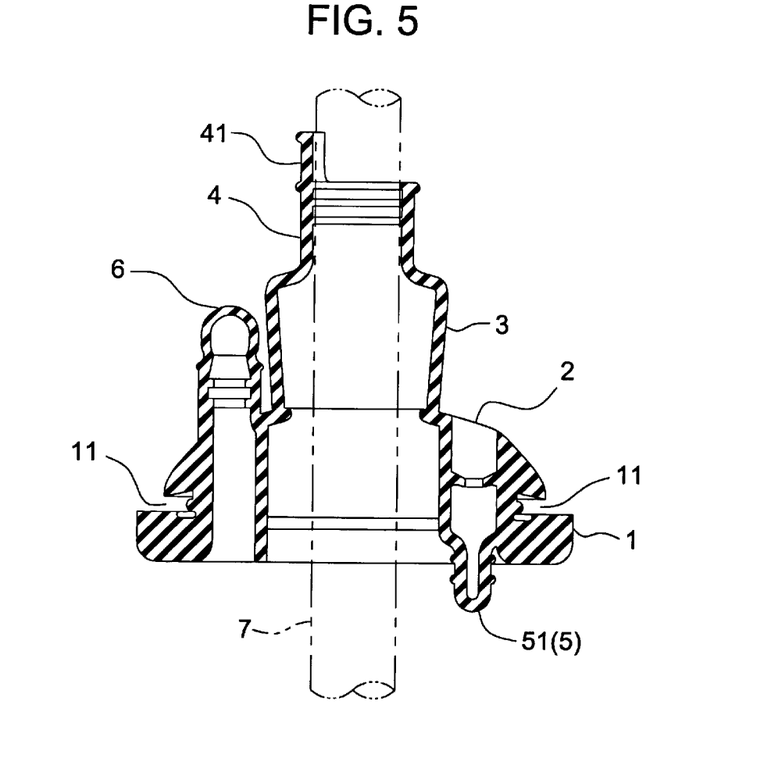
FIG. 5 is a longitudinal section view showing the grommet taken along the line A—A shown in FIG. 6.
Figure 6:
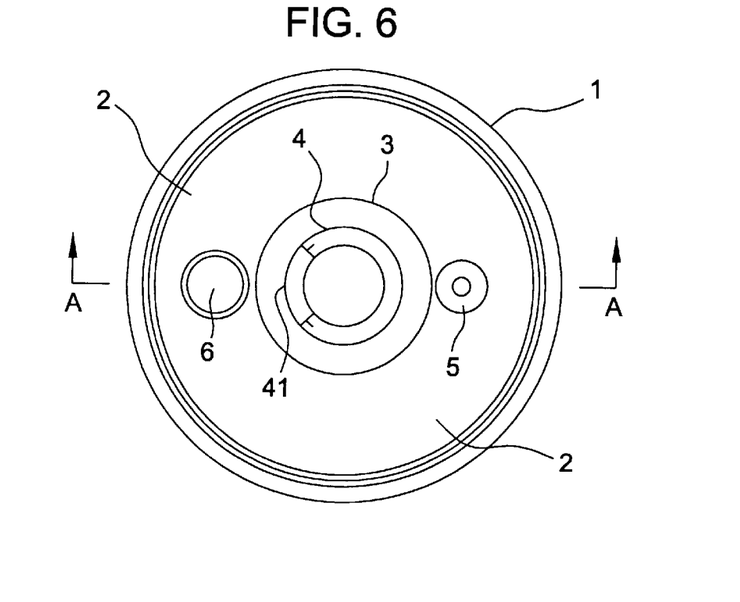
FIG. 6 is a plan view showing the grommet.

The annular cavity 19, preferably, as shown in FIG. 4, may be formed in the joint portion of the base portion 1 where the lower jaw portion 1a and the connecting portion 1c are jointed to each other. The reason why this structure is preferred is that, with the joint portion as the fulcrum thereof, the lower jaw portion 1a can be moved in its own way in a direction of an arrow shown in FIG. 10 with respect to the peripheral direction thereof while it is being deformed elastically as rubber, so that the lower jaw portion 1a can come into close contact with the entire area of the inclined burring 93 as well.

Figure 2:
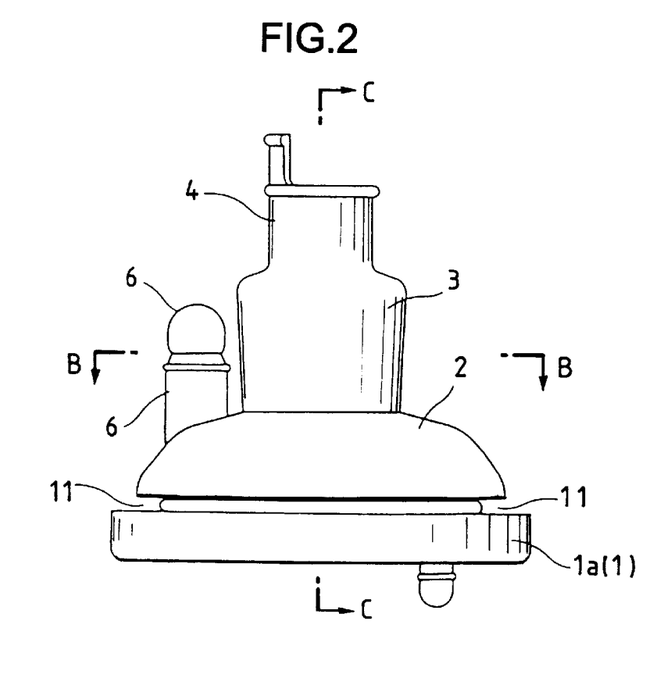
FIG. 2 is a front view showing the grommet shown in FIG. 1.

Now, reference numeral 2 designates a roof portion of the grommet which extends inwardly from the opening end of the upper jaw portion 1b of the base portion 1 having a large diameter as shown in FIG. 2. The base portion 1 and roof portion 2 cooperate together in forming a bowl-shaped body, which makes it easy for the grommet according to the invention to be slided along the opening edge 92 of the mating member 9 and mounted to the opening 91 of the mating member 9. In the present embodiment, the boundary between the base portion 1 and roof portion 2 is not clear, whereas the thickness of the roof portion 2 is thin, that is, it is of the order of 2 mm. The whole area of the roof portion 2 has a slope which swells gradually in the upward direction. Due to the fact that the roof portion 2 has this slope, as will be discussed later, when a liquid filler Z of a curable type is charged into the medium diameter portion 3, the level of the liquid surface of the filler Z can be lowered smoothly while the filler Z is permeating in the medium diameter portion 3.

Figure 3:
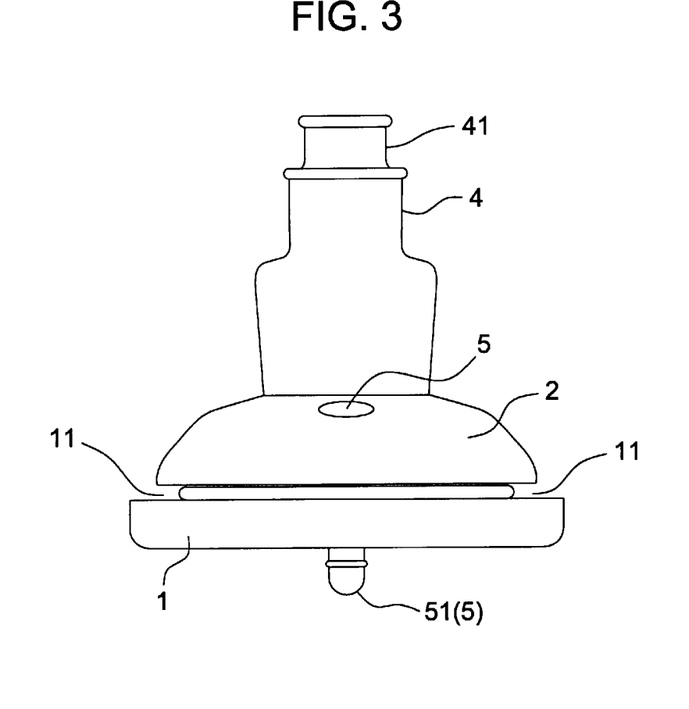
FIG. 3 is a side view of the grommet shown in FIG. 1.
Figure 13:
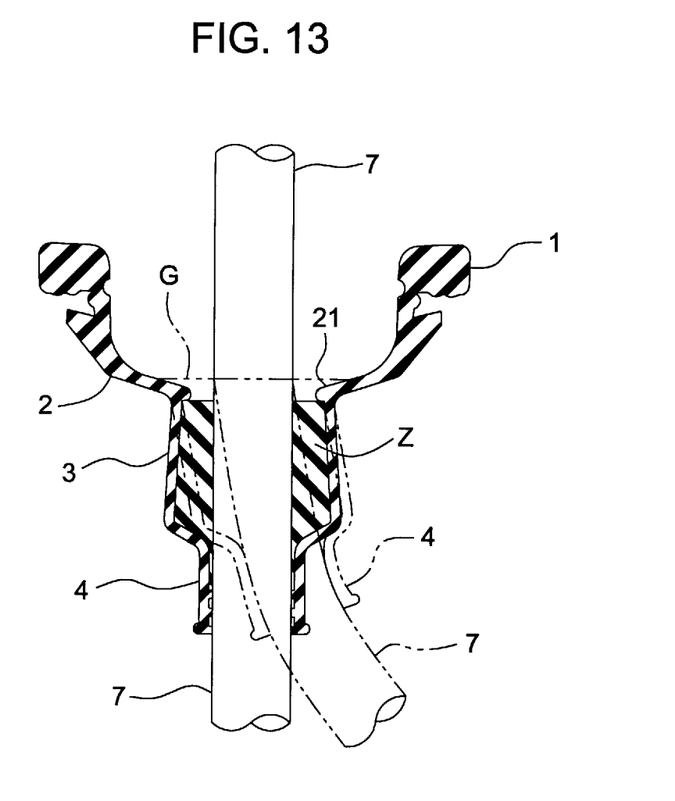
FIG. 13 is a longitudinal section view showing the grommet when a filler is loaded in the grommet.

Now, reference numeral 3 designates a medium diameter portion of the grommet which extends upwardly in the axial direction of the grommet from the roof portion 2 of the grommet as shown in FIG. 3. The medium diameter portion 3 is formed in a cylindrical shape, while the inside diameter of the medium diameter portion 3 is set larger than the bundle diameter of the wire harness 7 to be inserted through the medium diameter portion 3. For reference, the present invention aims at providing a grommet which can be used in common in various types of vehicles and, therefore, according to the design specifications thereof, a filler Z of a liquid and curable type to be described later can be loaded here. The medium diameter portion 3 is structured such that the cylindrical diameter thereof is slightly widened in an inverted taper manner as it goes upwardly as shown in FIG. 13. When the filler Z is charged into the medium diameter portion 3, the structure of the medium diameter portion 3 is useful in preventing the filler Z from slipping off, in view of the fact that the forming material of the grommet, that is, ethylene-propylene rubber has a poor adhesive force. In the present embodiment, the length of the cylindrical portion of the medium diameter portion 3 is of the order of 20 mm, whereas the inside diameter (of the order of 30 mmφ) of the upper end of the medium diameter portion 3 is larger by about 1–5 mm than the inside diameter of the lower end of the medium diameter portion 3.

By the way, in the joint portion between the medium diameter portion 3 and roof portion 2, the leading end portion of the roof portion 2 is extended to thereby provide an inwardly facing flange 21 which extends in the central direction of the grommet. The flange portion 21 and the medium diameter portion 3 formed in an inverted taper shape cooperate together in preventing the filler Z, which has been cured within the medium diameter portion 3, from slipping off the medium diameter portion 3 downwardly.

Figure 1:
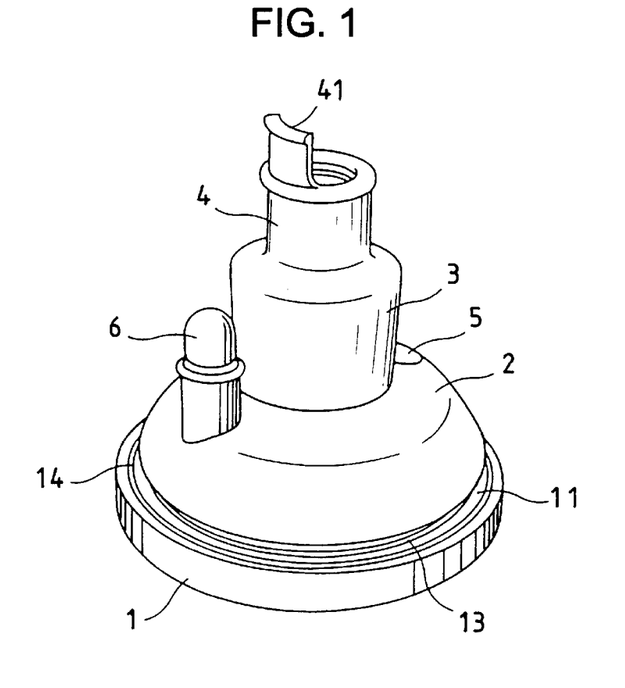
FIG. 1 is a perspective view showing a grommet according to an embodiment of the invention.

Now, reference numeral 4 designates a small diameter portion which reduces in diameter continuously from the opening end of the medium diameter portion 3 and extends further upwardly from the opening end of the medium diameter portion 3 (FIG. 1). The small diameter portion 4 plays a role to guide and hold the wire harness 7 which is to be inserted through the grommet. The inside diameter (of the order of 15 mmφ) of the small diameter portion 4 corresponds substantially to the bundle diameter of the wire harness 7, while the length of the small diameter portion 4 is of the order of 40 mm.

Reference numeral 41 stands for a guide piece which is provided by drawing out a portion of the opening edge from the small diameter portion 4. When the wire harness 7 is inserted through the grommet, the wire harness 7 is firstly secured to the guide piece 41 by use of tape or the like and, after then, the wire harness 7 is positioned and an operation to prevent the wire harness 7 from shifting out of position is performed.

Now, reference numeral 5 designates a through pipe for a hood cable, which is disposed such that it extends from the roof portion 2 along the inner wall of the base portion 1 and faces downwardly in the axial direction of the grommet. The through pipe 5 is sealed in the leading end thereof, while the leading end portion of the through pipe 5 is projected beyond the bottom surface of the base portion 1. 6 stands for a rear washer pipe which extends along the inner wall of the base portion 1 and is projected upwardly in the axial direction of the grommet from the roof portion 2. The rear washer pipe 6 is also sealed in the leading end thereof. When the grommet is applied to vehicles using the hood cable and rear washer, the leading end portions of the through pipe 5 and pipe 6 are respectively cut off, whereas in other kinds of vehicles they are left as they are.

Figure 7:
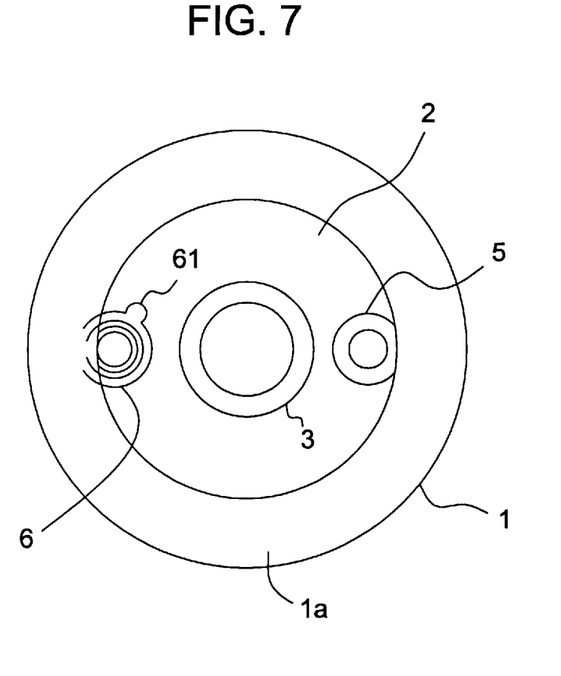
FIG. 7 is a bottom view of the grommet.
Figure 8:
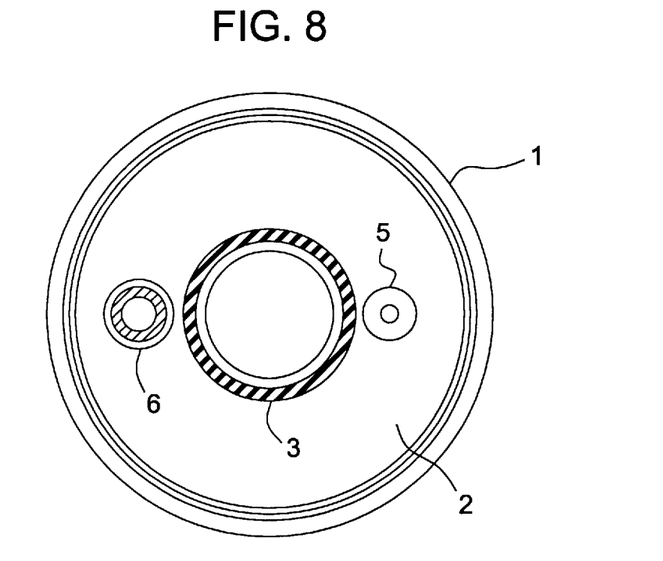
FIG. 8 is a section view showing the grommet taken along the line B—B shown in FIG. 2.

Reference numeral 61 stands for a thick portion for a gate which is provided in the outer wall of the pipe 6 and is used for injection charging as shown in FIG. 7.

When the grommet thus structured is fitted with the opening 91 formed in the mating member 9, for example, the following procedure may be adopted. At first, the wire harness 7 is inserted through the grommet. Thereafter, if the combined wire harness 7 and grommet are drawn out from the vehicle room side toward the engine room side while holding the small diameter side 4, then the opening edge 92 is slided on the upper inclined surface of the upper jaw portion 1b of the base portion 1 and is fitted into the mounting groove 11.

Figure 11:
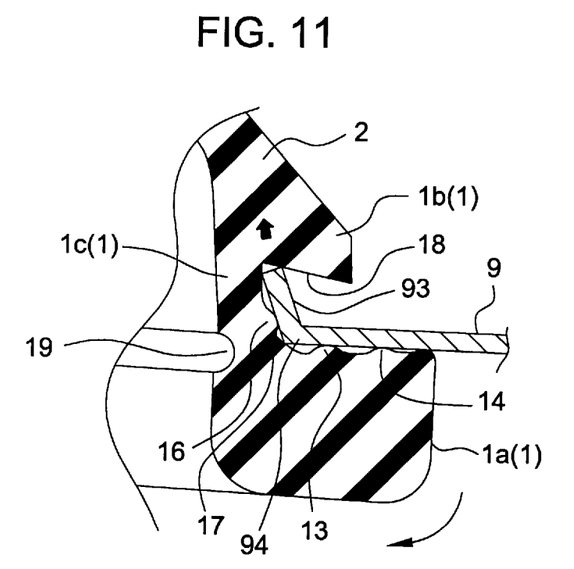
FIG. 11 is an enlarged section view showing the base portion of the grommet in the fitted condition thereof with respect to the mating member of the grommet.

When the opening edge 92 is formed by punching it in a circular shape and the opening edge 92 includes such an inclined burring 93 as shown in FIG. 12, the opening edge 92 is fitted into the mounting groove 11 in such conditions as shown in FIGS. 10 and 11.

When the burring 93 stands up at an acute angle with respect to the panel surface as shown in FIG. 10, the inner end portion 94 of the mating member 9 is abutted against the corner portion 17. Further, when the opening edge 92 is fitted with the mounting groove 11, since the seal ring portions 13, 14 and annular projection 16 are overlapped on the mating member 9, an external force is applied from the mating member 9 to the lower jaw portion 1a in a direction of an arrow shown in FIG. 10. However, because the annular cavity 19 is provided in the grommet, the annular cavity 19 contracts to absorb the external force.

The lower jaw portion 1a is rotated with the annular cavity 19 portion as a fulcrum and this rotation of the lower jaw portion 1a produces around the annular cavity 19 a rubber elastic restitution which pushes back the lower jaw portion 1a. As a result of this, the seal ring portions 13, 14 and annular projection 16 can keep their pressure contact with the mating member 9, thereby being able to enhance their water preventive functions. In this case, the leading end of the burring 93 is in contact with the upper surface 18 of the mounting groove 11.

On the other hand, when the burring 93 stands up at an obtuse angle with respect to the panel surface (FIG. 11), the inner end portion 94 of the mating member 9 is abutted against the corner portion 17 and, further, the leading end of the burring 93 pushes up the corner that is defined by the upper jaw portion 1b and the connecting portion 1c. Due to this pushup motion, an external force shown by a thick arrow in FIG. 11 is applied to the grommet, whereas this external force can be absorbed by the rotational deformation of the lower jaw portion 1a and the expansive deformation of the annular cavity 19 portion.

Referring to the seal ring portions 13, 14 and annular projection 16, since the base portion 1 is elastically deformed similarly to the case shown in FIG. 10, the seal ring portions 13, 14 and annular projection 16 are brought into pressure contact with the mating member 9.

Since the seal ring portions 13 and 14 are disposed inwardly of the outside diameter of the base portion 1, they can perform their water preventive functions even if the opening edge 92 portion of the mating member 9 provides a small area of flat portion which is necessary for the purpose of water prevention.

Thus, even if the burring 93 is inclined with respect to the panel surface, the provision of the annular cavity 19 allows the mounting groove 11 to be deformed flexibly, while the provision of the seal ring portions 13, 14 and annular projection 16 allows the grommet to be well fitted with the opening edge 92. Especially, in the grommet according to the present embodiment, as described before, there are provided five seal points at which the grommet is fitted with the mating member 9 in a pressure contact manner, thereby being able to secure an almost perfect water preventive function, that is, the present grommet is able to prevent water from invading into the vehicle room. However, according to the invention, it is not essential that the grommet must be always in pressure contact or in contact with the mating member 9 at all of the above-mentioned seal points thereof.

Further, besides the case in which the grommet is fitted with the opening edge 92 of the mating member 9 to thereby be able to perform a water preventive function, there is also a case in which a filler is loaded into the grommet in order to prevent invasion of water from between the wires forming the wire harness. The grommet according to the present embodiment is able to effectively cope with such case as well.

As the filler, generally, there is employed a filler of a hardenable liquid type that it is liquid when it is loaded into the grommet and it hardens with the passage of time. After the wire harness 7 is inserted through the grommet, the filler Z is loaded into the medium diameter portion 3 with the base portion 1 of the grommet facing upwardly as shown in FIG. 13. As described before, since the roof portion 2 has a slope, the level of the liquid surface of the filler Z is lowered down from its initial position G while the filler Z penetrates into gaps between the wires, and the filler Z is finally stored into the medium diameter portion 3. After the filler Z hardened, the inwardly facing flange 21 serves as a stopper against the hardened filler Z and, therefore, even if the filler Z has a poor adhesion force with respect to the grommet, the filler Z is prevented against slippage. Also, since the medium diameter portion 3 is increased in diameter toward the small diameter portion 4, the filler Z within the medium diameter portion 3 is difficult to slip off not only toward the small diameter portion 4 side but also toward the roof portion 2 side, that is, the filler Z is held positively by the grommet, which allows the filler Z to provide a high water preventive function.

On the other hand, when the filler Z is loaded into the grommet, the water preventive function of the grommet can be enhanced, whereas the portion (medium diameter portion 3) of the grommet into which the filler Z is loaded becomes hard. Therefore, when the wire harness 7 must be bent and disposed, the gaps S and M between the opening edge 92 of the mating member 9 and the base portion 1 of the grommet are widened, which results in a tendency to lower the sealing property of the grommet. On the contrary, in the grommet according to the present embodiment, even when the medium diameter portion 3 becomes hard, the roof portion 2 and small diameter portion 4 can be deformed so as to make up for the hardened medium diameter portion 3, thereby preventing the base portion 1 from being deformed, so that the water preventive function of the base portion 1 cannot be lowered (this condition is shown by chained lines in FIG. 13).

And, when an external bending force is applied, the conventional grommet is bent as a whole and thus the bent center of gravity thereof is high (FIG. 16). On the other hand, the grommet according to the invention is bent in the neighborhood of the root of the medium diameter portion 3 and thus the bent center of gravity thereof is lowered, thereby allowing the grommet to cope with the extremely bent position of the wire harness 7 easily. Also, even when the filler Z is not loaded into the grommet, since the medium diameter portion 3 is an invertedly tapered cylindrical body, the medium diameter portion 3 is easy to bend in the narrow portion thereof which corresponds to the root portion thereof, which can lower the bent center of gravity of the grommet similarly to the above case.

Also, since the through pipe 5 is formed so as to project beyond the bottom surface of the base portion 1, if the present grommet is applied to the vehicle using a hood cable, then the leading end of the through pipe 5 may be cut off, which can stabilize the sitting of the grommet. This is also a clear and great advantage when compared with the conventional grommet including a different type of through pipe. This makes it possible to find easily a careless mistake which could be made in the grommet assembling operation. Further, such projection of the through pipe 5 facilitates the setting of a jig.

The present grommet is able to cope with the above-mentioned various cases and can be applied as a common part to various kinds of vehicles, which is also useful in managing an inventory and in reducing the cost of the grommet.

Although the invention has been described heretofore using the above-mentioned embodiment thereof, the invention is not limited to this but it can be changed variously within the scope and spirit of the claims thereof according to the objects and uses. For example, the size, shape, material and the like of the base portion 1, roof portion 2, medium diameter portion 3, small diameter portion 4, mounting groove 11, annular cavity 19, inwardly facing flange 21 and the like can be changed according to uses. Also, the roof portion 2 may be formed in an umbrella shape, though the bending center of gravity thereof is higher. Further, the annular cavity 19 may be formed in any portion of the inner wall surface of the base portion 1 existing in the connecting portion 1c or lower jaw portion 1a.

As has been described hereinbefore, according to the grommet of the invention, even if the burring in the periphery of the opening is inclined and even if the wire harness is bent, the base portion of the grommet can be kept fitted with its mating member, which allows the grommet to fulfill a water preventive function. Also, if a filler is loaded into the medium diameter portion of the grommet while maintaining its water preventive function, then the grommet can also prevent invasion of water from between wires which form the wire harness. That is, the grommet according to the invention can provide excellent practical effects.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A grommet to be mounted into an opening formed in a mating member having a burring after a wire harness formed of a plurality of wires tied up in a bundle is inserted through the grommet, said grommet comprising:

a base portion made of rubber, the base portion defining in an annular outer peripheral wall thereof a mounting groove fittable with an opening edge of said mating member, the mounting groove defining a lower jaw portion, an upper jaw portion and a connecting portion between the lower jaw portion and the inner jaw portion of the base portion, the lower jaw portion and the connecting portion being joined at a joint portion, and a diameter of the upper jaw portion is smaller than that of the lower jaw portion, the mounting groove having lower, side and upper surfaces, the upper surface of the mounting groove extending downwardly toward the exterior of the base portion the lower surface of the mounting groove extending upwardly toward the exterior of the base portion, at least one lower seal ring extending from the lower surface of the mounting groove and spaced inwardly from an exterior surface of the lower jaw portion, and a side seal ring extending from the side surface of the mounting groove, the side seal ring having a diameter larger than a diameter of the at least one lower seal ring, the base portion further defining an annular cavity at a portion of an inner peripheral wall of the base portion that corresponds to the position of the mounting groove and the annular cavity is formed in the joint portion of the base portion where the lower jaw portion and the connecting portion are joined to each other;

a roof portion extending inwardly from an exterior surface of the upper jaw portion of the base portion; and a cylindrical small diameter portion extending upwardly from the roof portion in the axial direction of the grommet;

wherein the mounting groove provides a water-tight seal with the mating member independent of an angle of inclination of the burring of the mating member.

2. The grommet according to claim 1, wherein the at least one lower seal ring includes two lower seal rings.

* * * * *